United States Patent
Gonzalez et al.

(10) Patent No.: US 11,176,795 B2
(45) Date of Patent: Nov. 16, 2021

(54) DURABLE ASSET MANAGEMENT TAG

(71) Applicant: Impact Resources, Inc., Bethesda, MD (US)

(72) Inventors: Cesar Gonzalez, San Marcos, CA (US); Jason Hackerson, Bristow, VA (US)

(73) Assignee: IMPACT RESOURCES, INC., Bethesda, MD (US)

( * ) Notice: Subject to any disclaimer, the term of this patent is extended or adjusted under 35 U.S.C. 154(b) by 0 days.

(21) Appl. No.: 16/482,189

(22) PCT Filed: Jan. 26, 2018

(86) PCT No.: PCT/US2018/015477
§ 371 (c)(1),
(2) Date: Jul. 30, 2019

(87) PCT Pub. No.: WO2018/144341
PCT Pub. Date: Aug. 9, 2018

(65) Prior Publication Data
US 2020/0250950 A1   Aug. 6, 2020

Related U.S. Application Data

(63) Continuation-in-part of application No. 15/422,371, filed on Feb. 1, 2017, now Pat. No. 10,330,412.

(51) Int. Cl.
*G08B 13/14* (2006.01)
*G08B 13/24* (2006.01)
*G06Q 10/08* (2012.01)

(52) U.S. Cl.
CPC ....... *G08B 13/2468* (2013.01); *G06Q 10/087* (2013.01); *G08B 13/1427* (2013.01)

(58) Field of Classification Search
CPC ............ G08B 13/2468; G08B 13/1427; G06Q 10/087

(Continued)

(56) References Cited

U.S. PATENT DOCUMENTS 4,296,929 A   10/1981  Meyer et al.
5,785,592 A    7/1998  Jacobsen
(Continued)

FOREIGN PATENT DOCUMENTS

JP    2016-029524 A    3/2016

OTHER PUBLICATIONS

International Preliminary Report on Patentability, International Application No. PCT/US2018/015477, dated Aug. 15, 2019.
(Continued)

*Primary Examiner* — Tanmay K Shah
(74) *Attorney, Agent, or Firm* — Dickinson Wright PLLC

(57) ABSTRACT

A tracking system (20) for durable assets such as personal weapons (22) is provided. The tracking system (20) includes a durable asset tag (84) including an RFID transponder physically mounted within an externally exposed cavity of the durable asset (22), and an identification card (32) with a machine-readable unique identifier associated with a person. The system also includes first (40) and second (48) databases, each storing information associated with the durable asset (22), and an interface terminal (56) for receiving a unique identifier from the durable asset tag (84) and the unique identifier from the identification card (32), and which communicates with the databases (40, 48) for checking in or checking out the durable asset (22) to the person having the identification card (32). The durable asset tag (84) may be original to the durable asset (22) or retrofitted thereto after manufacture. Multiple durable asset tags (84) may be associated with a durable asset (22) to provide increased range and reliability, and to reduce the likelihood of tampering. Methods are also provided for associating unique identifiers with a durable asset (22), tagging the durable asset (22), and checking in and checking out the durable asset (22).

18 Claims, 10 Drawing Sheets

(58) Field of Classification Search
USPC .................................................. 340/572.1
See application file for complete search history.

(56) References Cited

U.S. PATENT DOCUMENTS

| | | | |
|---|---|---|---|
| 6,031,454 | A | 2/2000 | Lovejoy et al. |
| 6,601,764 | B1 | 8/2003 | Goodwin, III |
| 7,004,848 | B2 | 2/2006 | Konow |
| 7,109,859 | B2 | 9/2006 | Peeters |
| 7,148,803 | B2 | 12/2006 | Bandy et al. |
| 7,412,898 | B1* | 8/2008 | Smith .................. G01L 5/24 73/761 |
| 7,461,972 | B2 | 12/2008 | Cohen |
| 7,518,504 | B2 | 4/2009 | Peeters |
| 7,782,208 | B2 | 8/2010 | Kennedy |
| 7,969,307 | B2 | 6/2011 | Peeters |
| 8,683,727 | B2 | 4/2014 | McLean |
| 9,041,538 | B2 | 5/2015 | Peeters |
| 9,470,699 | B2 | 10/2016 | Peeters |
| 9,931,578 | B2 | 4/2018 | Weston |
| 2003/0008722 | A1 | 1/2003 | Konow |
| 2005/0183314 | A1 | 8/2005 | Holznecht et al. |
| 2005/0248459 | A1* | 11/2005 | Bonalle .............. G08B 13/2417 340/572.8 |
| 2005/0262751 | A1 | 12/2005 | Leslie |
| 2006/0208857 | A1 | 9/2006 | Wong |
| 2010/0050778 | A1 | 3/2010 | Herley et al. |
| 2011/0153637 | A1 | 6/2011 | Bailey et al. |
| 2011/0174885 | A1 | 7/2011 | Hansen |
| 2011/0309975 | A1 | 12/2011 | Chu |
| 2012/0298758 | A1 | 11/2012 | Vishwanath |
| 2013/0140367 | A1 | 6/2013 | Binmore |
| 2014/0260424 | A1 | 9/2014 | Warren |
| 2014/0292477 | A1* | 10/2014 | Ahmadloo .......... G06K 7/10168 340/5.8 |
| 2014/0357373 | A1 | 12/2014 | Barney et al. |
| 2015/0077255 | A1 | 3/2015 | Pallotta |
| 2015/0230872 | A1* | 8/2015 | Lundkvist .......... A61B 10/0291 600/572 |
| 2015/0235120 | A1 | 8/2015 | Warren |
| 2016/0076852 | A1* | 3/2016 | Liu .................... F41C 33/0209 224/587 |
| 2016/0152350 | A1* | 6/2016 | Puentes ................ B64F 1/368 340/10.5 |
| 2017/0014714 | A1 | 1/2017 | Barney et al. |
| 2018/0039934 | A1* | 2/2018 | Mulaosmanovic .. G06Q 10/087 |

OTHER PUBLICATIONS

International Application No. PCT/US18/15477—Invitation to pay additional fees, and where applicable, protest fees—dated Apr. 27, 2018.
R-Boll RTEC—http://www.rfrid.com/En/Home/ProductDetail/id/39 (retrieved Sep. 14, 2018).
Cheap Price Customized Metal RFID Screw Tag, Techcrepower Technologies Limited—https://techcrepower.en.made-in-china.com/product/DNUQmpYVugcR/China-Cheap-Price-Customized-Metal-RFID-Screw-Tag.html (retrieved Sep. 14, 2018).
UHF 915 MHz Bolt & Screw RFID Tags, RFID, Inc.—https://www.rfidinc.com/uhf-915-mhz-bolt-screw-rfid-tags/ (retrieved Sep. 14, 2018).
SYNOTAG RFID Bolt for Through-hole Applications, SYNOMETRIX Limited—https://www.synometrix.com/rfid-tags/hardware-tags/nut-bolt-tag-816/ (retrieved Sep. 14, 2018).
Bolt on RFID Tag—William Frick & Company—https://www.fricknet.com/Products/SmartMark_RFID/Compact_Bolt_on_RFID_Tag.html (retrieved Jan. 13, 2017).
General Motors Factory Installs Smart Bolts in Engine Blocks, Cylinder Heads by Claire Swedberg http://www.rfidjournal.com/articles/view?11329 (retrieved Jan. 13, 2017).
GyRFID presents RFID Screw Tag (SCA Series) for asset tracking—https://www.prlog.org/10748266gyrlidpresentsrfidscrewtagscaseriesforassettracking.html (retrieved Jan. 24, 2017).
Rfid Pin Tag Product on Alibaba.com—https://www.alibaba.com/productdetail/rfidpintag_2014510788.html (retrieved Jan. 24, 2017).
Screw & Bolt Tags RFID Inc.—http://rfidinc.com/products/866928mhzuhf/screwbolttags/ (retrieved Jan. 13, 2017).
This Bolt is the Key to GM's High-Tech Assembly Line, Matthew De Paula http://www.popularmechanics.com/cars/a9959/thisboltisthekeytogmshightechassemblyline16324897/ (retrieved Jan. 13, 2017).
UHF 860-928 MHz RFID Bolt Tag_ GAO RFID Inc.—http://gaorfid.com/product/ruggeduhfrfidbolttagforonmetalapplication/ (retrieved Jan. 24, 2017).

* cited by examiner

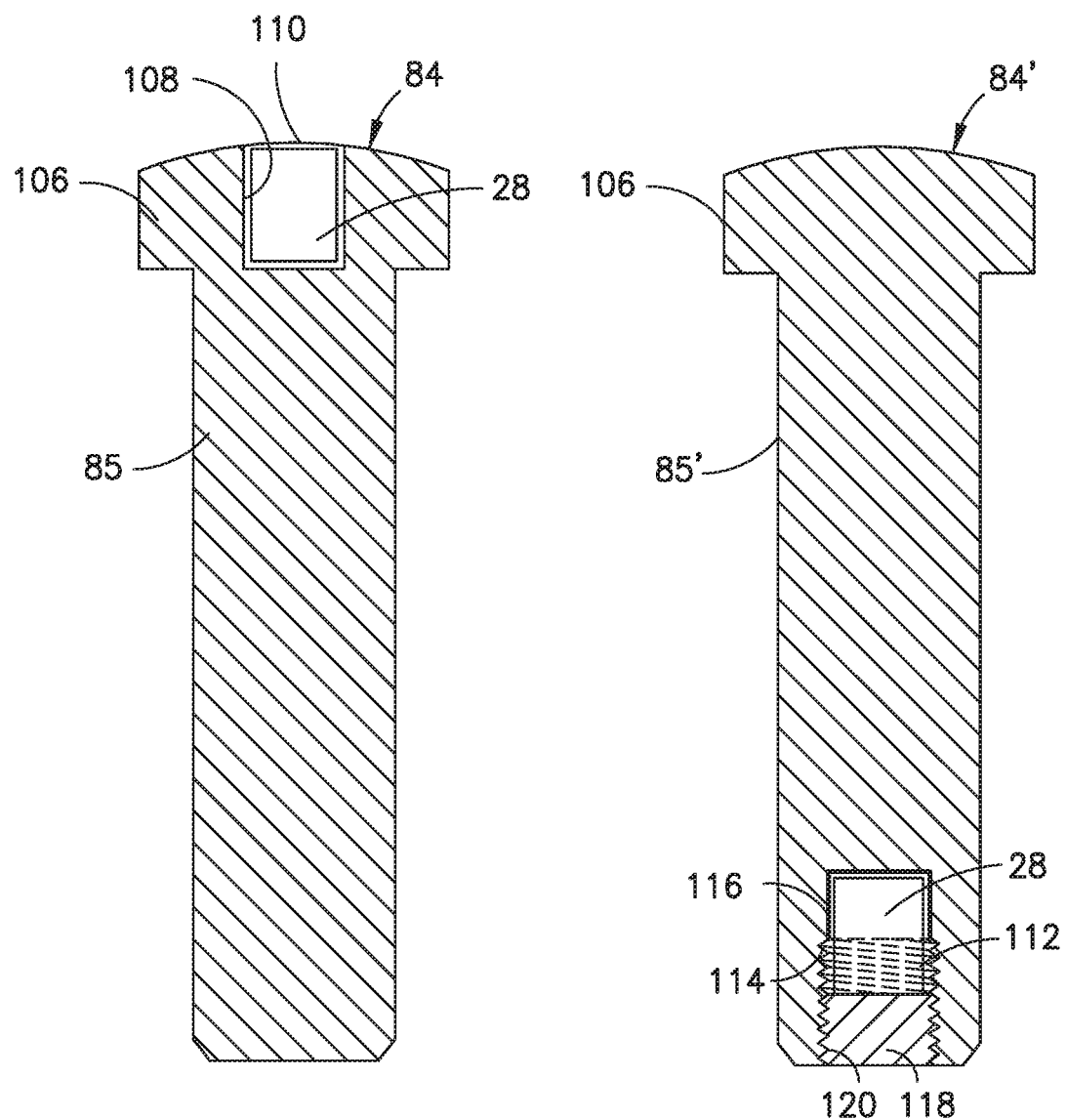

DURABLE ASSET MANAGEMENT TAG

This application is a national stage of International Application No. PCT/US2018/015477, filed Jan. 26, 2018, which claims the benefit of, and for the United States is a continuation-in-part of, U.S. patent application Ser. No. 15/422,371, filed Feb. 1, 2017 and entitled "Durable Asset Management Tag," the entire disclosure of which is hereby incorporated by reference.

BACKGROUND OF THE INVENTION

Field of the Invention

The present invention relates generally to a tracking system for durable assets such as personal weapons, and more specifically to a system including a durable asset tag which can be provided as a structural component of the durable asset and which includes an RFID transponder capable of wireless communication for uniquely identifying the durable asset.

Description of the Prior Art

Systems for tracking durable assets using RFID transponders are known in the prior art. One such system is disclosed in U.S. Patent Application Publication No. 2005/0262751, in which a passive-type RFID transponder is mounted within a personal weapon and is used to track the issuance of the personal weapon to an individual person. Another such system is disclosed in U.S. Patent Application Publication No. 2006/0208857, which generally describes the RFID transponder being embedded in a durable asset.

SUMMARY OF THE INVENTION

The invention provides for a durable asset tag including an RFID transponder that can be provided as a structural component of a durable asset, such as a personal weapon. The durable asset tag of the present invention provides for RFID tracking of the durable asset and can be easily installed in an externally exposed cavity of a durable asset in place of an existing component, without the need for a time-intensive tear-down of the durable asset, and without requiring the durable asset to be otherwise modified in any way. The durable asset tag can be easily swapped out for a different durable asset tag or for a non-RFID replacement component. By placing the RFID transponder within a removable durable asset tag, the RFID transponder can be protected from physical damage and from chemical agents such as cleaning solvents. It also allows for durable asset to be wirelessly identified without altering the military specification, structural integrity, assembly, or maintenance of the durable asset.

The invention also provides for a method for a tracking system which includes inserting an RFID transponder within a plug of electrically insulating material, and inserting the plug together with the RFID transponder within a cavity of a metal body of the durable asset tag, and sealing the cavity with the plug disposed therein with a covering, which functions to secure the plug and the RFID transmitter within the body and to prevent the intrusion of contaminants. The invention also provides for a method of associating one or more unique identifiers with a durable asset, including a second unique identifier of an RFID transponder installed within the durable asset, and for storing the association in a database. This allows for a tracking system that can wirelessly identify the durable asset, to receive information about it, and to check in and check out the durable asset by recording its association with a third unique identifier of a person to whom the durable asset is checked in or checked out.

BRIEF DESCRIPTION OF THE DRAWINGS

These and other advantages of the present invention will be readily appreciated, as the same becomes better understood by reference to the following detailed description when considered in connection with the accompanying drawings, wherein:

FIG. 8 is a cross-section of a durable asset tag according to an embodiment of the subject invention;

FIG. 9 is a cross-section of a durable asset tag according to another embodiment of the subject invention;

DETAILED DESCRIPTION OF EMBODIMENTS OF THE INVENTION

Figure 1:
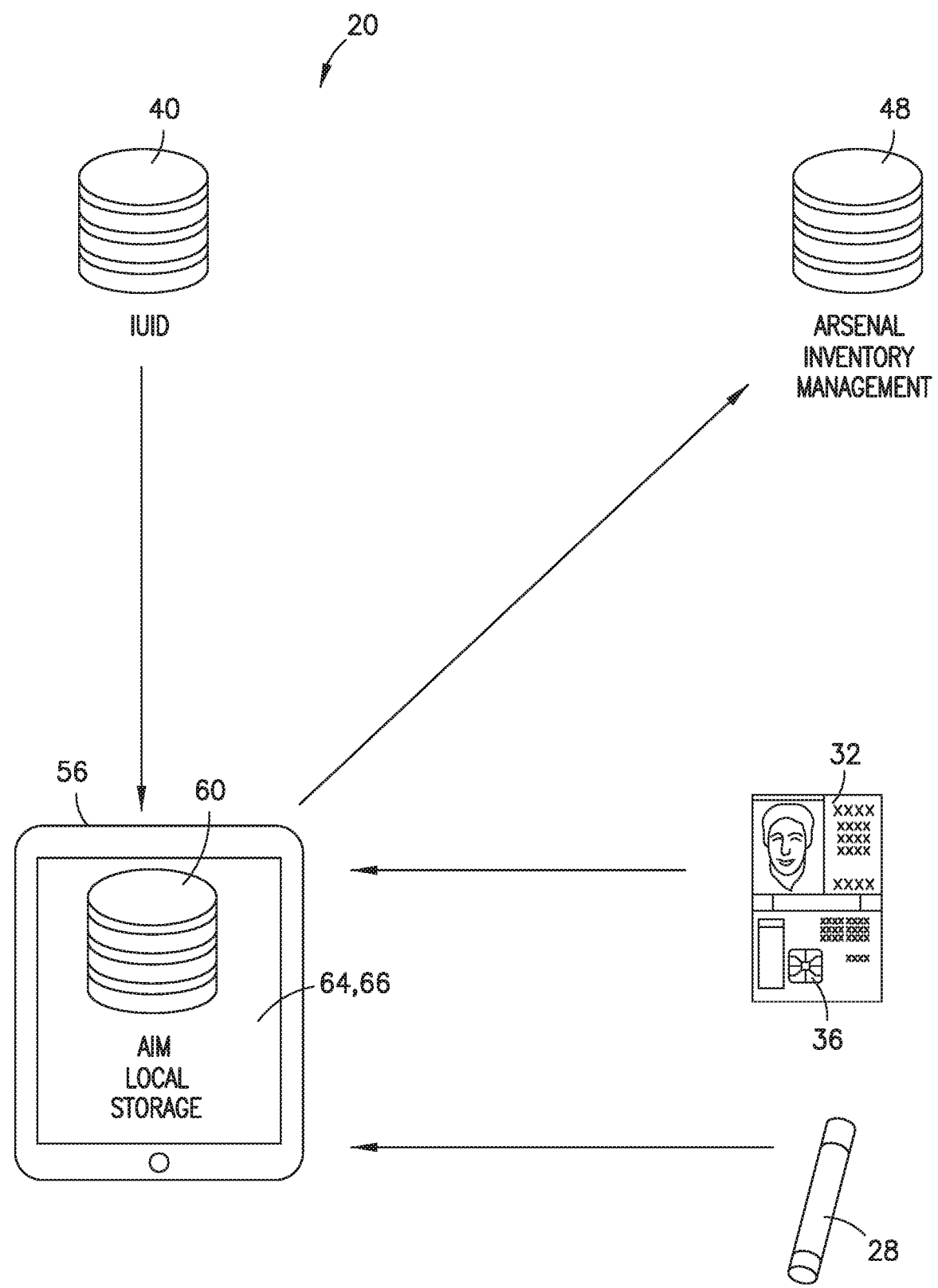
FIGS. 1 and 2 are block diagrams of a tracking system according to an embodiment of the subject invention.

Referring to the drawing figures, wherein like numerals indicate corresponding parts throughout the several views, an embodiment of a tracking system 20 for durable assets such as personal weapons 22 is generally shown in FIGS. 1-9, 10A-10B, 11A-11C, and 12-15. A personal weapon 22 is defined herein as a weapon capable of being carried by an individual person. Examples of personal weapons include but are not limited to rifles, pistols, shotguns, other types of firearms, knives, bayonets, grenades, and so on. Personal weapons may also include non-lethal weapons and defensive devices including but not limited to Tasers, stun guns, pepper spray dispensers, tear gas canisters, handcuffs, nightsticks, and batons. The personal weapon 22 may have a serial number 24 imprinted thereon and unique to that specific personal weapon 22 among all other personal weapons 22 having the same manufacturer and model. The personal weapon 22 may be associated with a first unique identifier 26 in the form of a string of characters which is globally unique and unambiguous for distinguishing the personal weapon 22 from all other like and unlike items. The first unique identifier 26 may be, for example, a U.S. Department of Defense (DoD) standard Unique Item Identifier (UII).

The tracking system 20 may include an RFID transponder 28, which may be a passive RFID device that is externally powered and has a second unique identifier 30 which is machine readable by radio frequency and which may be physically mounted within the personal weapon 22. The second unique identifier 30 may be the same as the first unique identifier 26. Alternatively, the second unique identifier 30 may be different from the first unique identifier 26, and may be a shortened or compressed version thereof. Such an arrangement may be used, for example where the RFID transponder is not capable of storing the entire first unique identifier 30 due to identifier size limitations. The second unique identifier 30 may also be entirely different from the first unique identifier 26 and be associated therewith by reference to a mapping database or by other means. The RFID transponder 28 may be, for example, Hitachi Model No. IM5-PK2525, having dimensions of 2.5 mm×2.5 mm×0.4 mm.

The tracking system 20 may include an identification card 32 associated with an individual person who the personal weapon 22 may be checked out to or checked in from. The identification card 32 may have a machine-readable third unique identifier 34 associated therewith and may be, for example, a U.S. DoD Common Access Card (CAC) with an integrated circuit chip 36 including a first storage medium 38 being computer-readable non-transitory storage and holding the third unique identifier 34.

Figure 2:
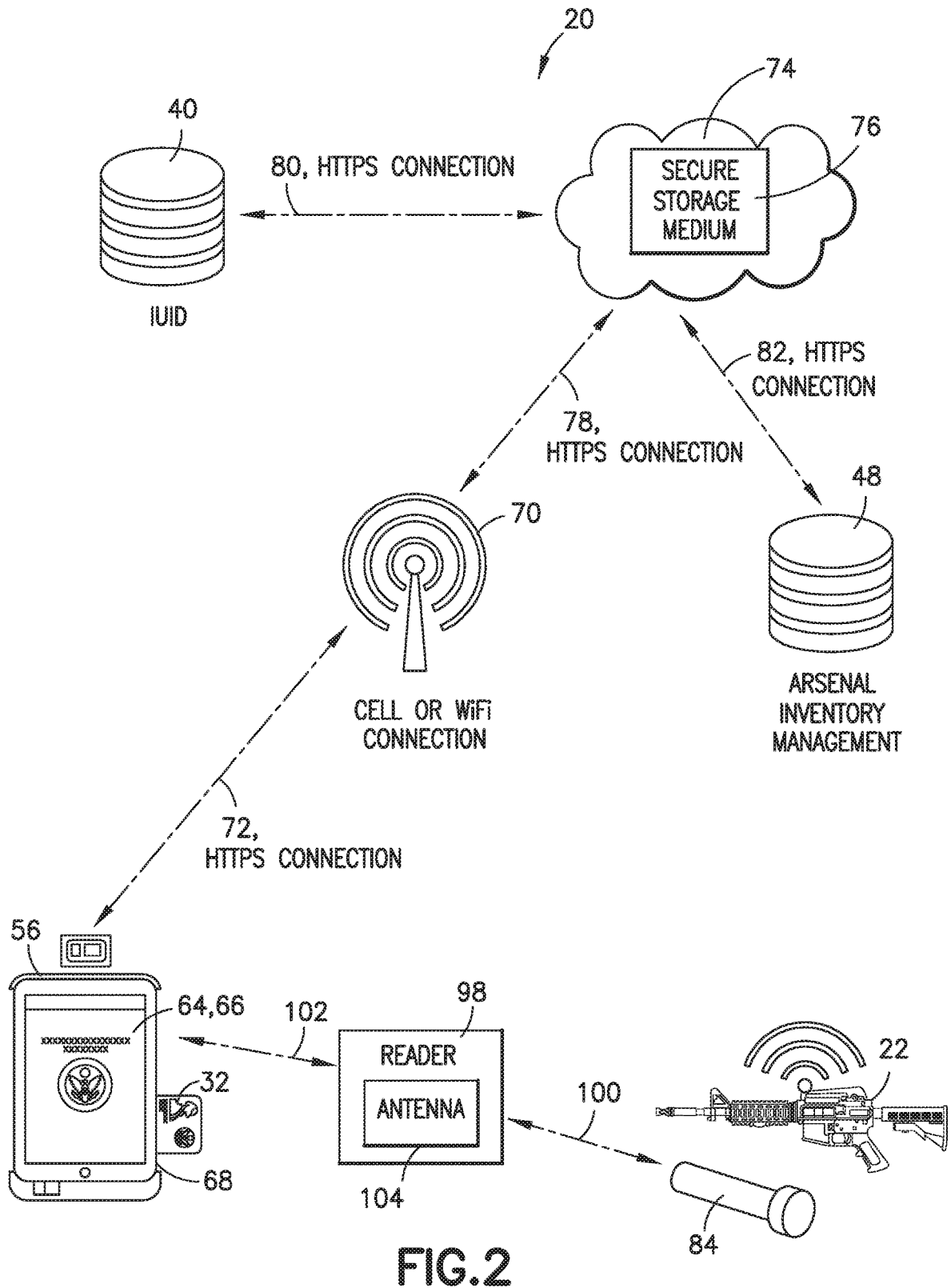
Figure 3:
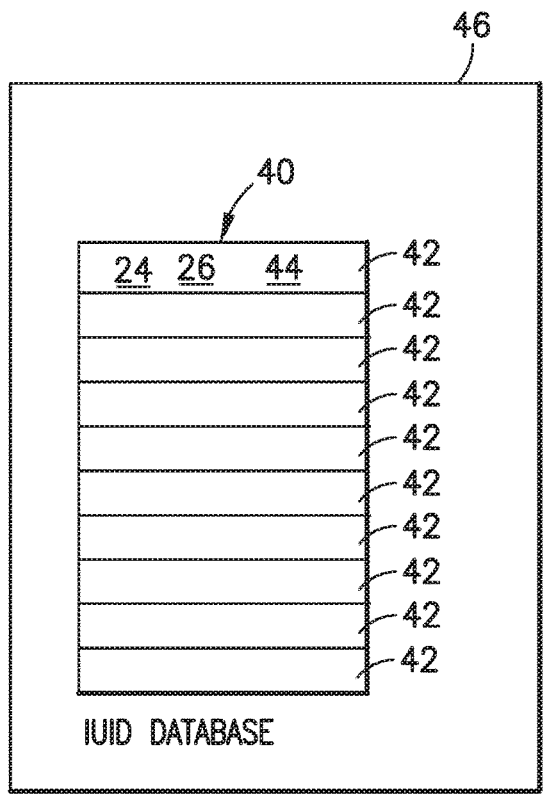
FIG. 3-5 are schematic diagrams of storage media and data structures stored therein according to an embodiment of the subject invention.

As shown in FIGS. 1-3, the tracking system 20 may include a first database 40 storing a plurality of first entries 42, each of which corresponds to a physical item. The first database 40 may be, for example, an Item Unique ID (IUID) Database. As shown in FIG. 3, one of the first entries 42 in the first database 40 may be associated with the personal weapon 22 and may include the first unique identifier 26 and background data 44 about the personal weapon 22, which may include, for example, a serial number 24, a make, a model, a manufacturer name, and/or an acquisition date. The first database 40 may be located on a second storage medium 46 being a computer-readable non-transitory storage medium.

Figure 4:
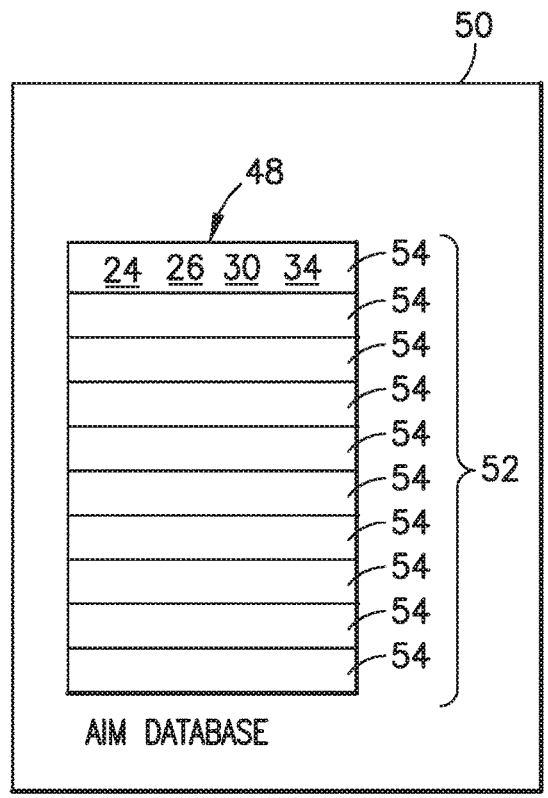

As shown in FIGS. 1-3, the tracking system 20 may include a second database 48 which may be an Arsenal Inventory Management (AIM) database. As shown in FIG. 4, the second database 48 may be located on a third storage medium 50 which may be a computer-readable non-transitory storage medium, with the second database 48 storing a first plurality 52 of second entries 54, with each of the second entries 54 corresponding to a specific individual item and including the first unique identifier 26 and the second unique identifier 30, each associated therewith.

Figure 5:
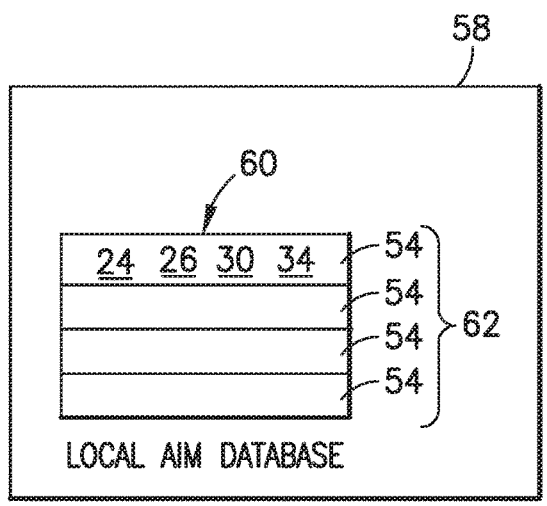
Figure 6:
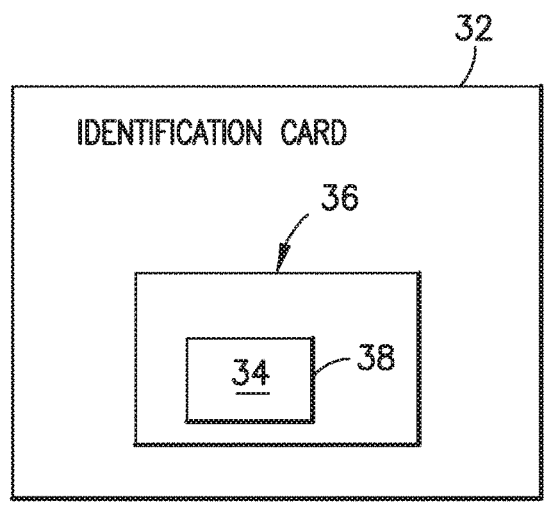
FIG. 6 is a block diagram of an identification card according to an embodiment of the subject invention.

As shown in FIGS. 1-2, the tracking system 20 may include an AIM interface terminal 56, which can be a portable electronic device such as an iPad, tablet, smart phone, or other device, and which is capable of securely communicating with the second database 48. As shown in FIG. 5, the portable electronic device may include a fourth storage medium 58 being a computer-readable non-transitory storage medium, which may store a third database 60 holding a second plurality 62 of the second entries 54 being a subset of the first plurality 52 of the second entries 54 in the second database 48. The AIM interface terminal 56 includes a display screen 64 for communicating information to a user, and a user input device 66 such as a touch screen. The AIM interface terminal 56 may also include and a smart card interface 68 for reading the third unique identifier 34 from the integrated circuit chip 36 in order to uniquely identify the individual person who the personal weapon 22 is to be checked out to or checked in from. Such smart card interface 68 may include, for example, a TSS-PK series iPad reader from Thursby Software Systems, Inc.

As shown in FIG. 1, the tracking system 20 may include an access point 70 in the form of a wireless router providing a first secure connection 72 for transmitting data between the AIM interface terminal 56 and one of the first database 40 or the second database 48. The first secure connection 72 may be, for example, a Wi-Fi connection or a cellular data connection.

As shown in FIG. 1, the tracking system 20 may also include a secure cloud service 74 including a fifth storage medium 76 being a computer-readable non-transitory storage medium and being distributed among one or more physical devices for temporarily storing copies of the data being sent to or read from the AIM interface terminal 56. The cloud service 74 may be, for example, a hosting enclave approved by the U.S. DoD or another government department or agency. The system may include any combination of a second secure connection 78 for transmitting data between the access point 70 and the cloud service 74, a third secure connection 80 for transmitting data between the cloud service 74 and the first database 40, and a fourth secure connection 82 for transmitting data between the cloud service 74 and the second database 48. Any or all of the secure connections 72, 78, 80, 82 may be secured using the HTTPS standard. Any or all of the secure connections 72, 78, 80, 82 may also be secured in part or in whole using public key encryption.

The tracking system 20 may also include a durable asset tag 84, 84', 84" including the RFID transponder 28. The durable asset tag 84, 84', 84" is preferably an assembly-level component of the personal weapon 22 which preferably remains stationary as the personal weapon 22 is used. Such use includes, for example where the personal weapon 22 is a firearm, firing and cycling between shots. The durable asset tag 84, 84', 84" may be cylindrical and may be installed within an externally exposed cavity of the personal weapon 22 in a single-step operation, meaning that it can replace a standard (original) component of the personal weapon 22 which is externally exposed and which has been removed, and that the process of installing the durable asset tag 84, 84', 84" in place of the standard component of the personal weapon 22 can be accomplished in a single step. The single step may be, for example, screwing, pounding, pressing, or otherwise installing the durable asset tag 84, 84', 84". The single step may be the same as the step of installing the original component of the personal weapon 22 which the durable asset tag 84, 84', 84" replaces. The same tools and procedures may be used to install the durable asset tag as the component it replaces. Therefore, the assembly, manufacture, use, and maintenance of the personal weapon 22 may be the same as it would be without the use of the durable asset tag. With the exception of the durable asset tag 84, 84', 84", the personal weapon 22 may be entirely unmodified from its factory condition and may maintain its specification, certification, and/or rating, as well as its original appearance.

Figure 7:
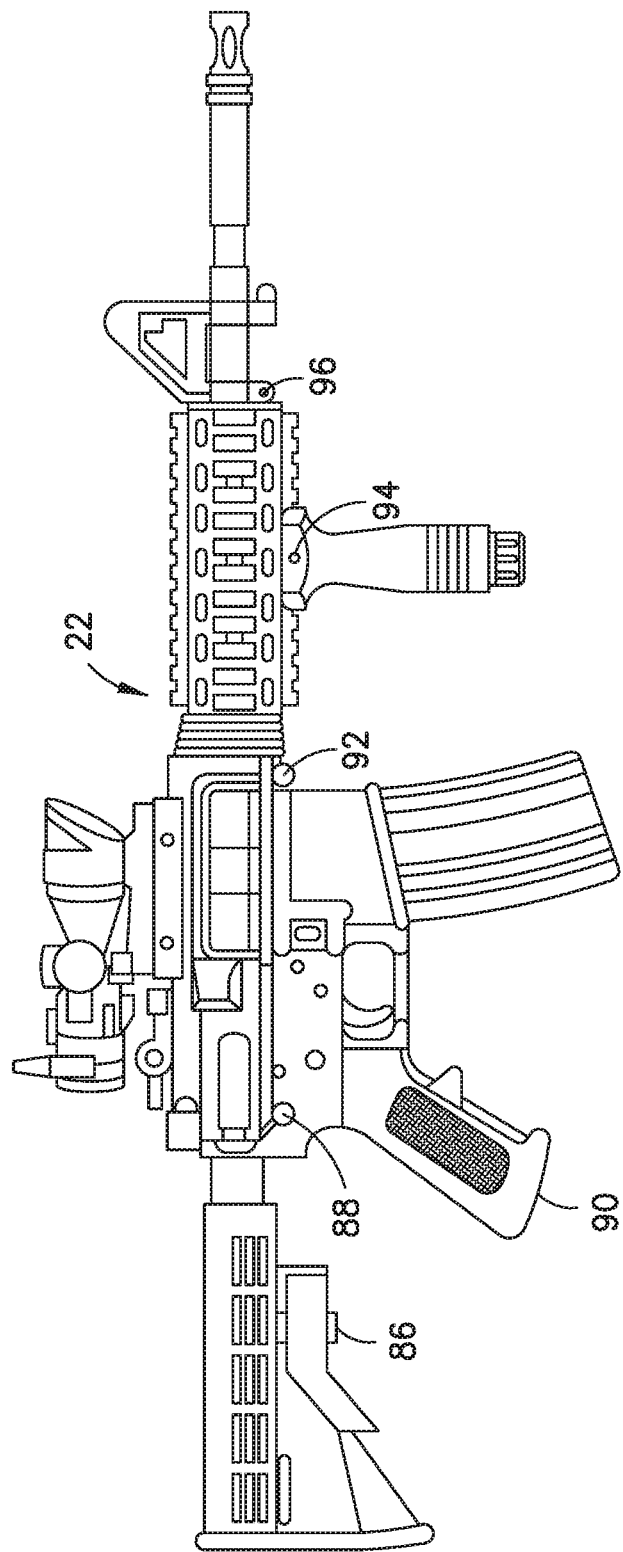
FIG. 7 is diagram of a personal weapon that has been modified with a durable asset tag according to an embodiment of the subject invention.
Figure 10A:
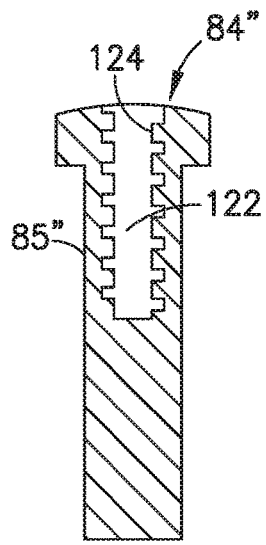
FIG. 10A is a cross-section of a durable asset tag according to still another embodiment of the subject invention.

As shown in FIG. 7, the personal weapon 22 typically includes two or more externally exposed cavities. Therefore, the tracking system 20 may also include two or more durable asset tags 84, 84', 84", each including its own RFID transponder 28, and with each of the durable asset tags 84, 84', 84" disposed in a respective different one of the externally exposed cavities of the personal weapon 22. In other words, a personal weapon 22 may include two or more durable asset tags 84, 84', 84" at the same time. Using two or more two or more durable asset tags 84, 84', 84" in the personal weapon 22 at the same time can provide several different advantageous results. For example, it can provide redundancy in case one of the RFID transponders 28 fails. It can also provide enhanced security with redundant ones of the durable asset tags 84, 84', 84" in case one or more of the durable asset tags 84, 84', 84" is purposely or accidentally removed or rendered inoperative, for example, by being damaged or by being covered by a shielding material that blocks the radio frequency (RF) radiation to or from the RFID transponder 28. The use of two or more durable asset tags 84, 84', 84" in the personal weapon 22 can also improve reading of the second unique identifier 30 from the personal weapon 22 by providing additional RFID transponders 28 disposed therein. This may enable an RFID reader 98 with fewer and/or smaller first antennas 104 to be used and/or may improve the probability of successfully reading the second unique identifier 30 by presenting multiple different RFID transponders 28 at different locations and/or orientations for the RFID reader 98 to interrogate.

According to an aspect, each of the RFID transponders 28 in the plurality of durable asset tags 84, 84', 84" disposed in the personal weapon 22 may have the same second unique identifier 30 as all of the other ones of the RFID transponders 28 in the plurality of durable asset tags 84, 84', 84" disposed in the personal weapon 22. In other words, all of the RFID transponders 28 disposed in a given personal weapon 22 may have the same second unique identifier 30. Alternatively, each of the RFID transponders 28 disposed in a given personal weapon 22 may have a different second unique identifier 30. A single second unique identifier 30 may simplify tracking and storage by allowing a 1:1 association of the second unique identifier 30 to a given first unique identifier 26 of the personal weapon 22.

The use of different second unique identifiers 30 in each of the RFID transponders 28 in a given personal weapon 22 may be required and/or be preferable, for example, where RFID transponders 28 are available only or at a reduced cost with different second unique identifiers 30. The use of different second unique identifiers 30 in different RFID transponders 28 within the same personal weapon 22 may also be advantageous for reasons, such as for allowing replacement of one of the durable asset tags 84, 84', 84" (e.g., in case of a failure) without requiring all of the durable asset tags 84, 84', 84" in that personal weapon 22 to be replaced and without requiring a new durable asset tag 84, 84', 84" to be acquired or programmed with a second unique identifier 30 that matches the second unique identifier 30 of the other one or ones of the durable asset tags 84, 84', 84" not requiring replacement.

The use of multiple durable asset tags 84, 84', 84" in the same personal weapon 22 as described above may be applied to other types of durable assets, including, for example, optics devices such as night vision goggles and weapons scopes, man-portable, and man-packable items, and larger items such as vehicles, trailers, and generators.

According to an aspect, and as shown in FIGS. 7-9 and 10A, the durable asset tag 84, 84', 84" may be a pin, screw, bolt, or other fastener for joining together two or more assembly-level components of the personal weapon 22. The durable asset tag 84, 84', 84" may be, for example, a buttstock slide lock pin 86, a takedown pin 88, a pistol grip screw 90, a pivot pin 92, a forward grip pin 94, or a front sight pin 96. By placing the RFID transponder 28 within a removable durable asset tag 84, 84', 84", the RFID transponder 28 may be protected from physical damage and from chemical agents such as cleaning solvents. It also allows for the personal weapon 22 to be wirelessly identified without altering the military specification or the structural integrity of the personal weapon 22. These are merely illustrative examples, and the durable asset tag 84, 84', 84" may take other forms which may depend on the type and model of personal weapon 22 into which it is to be installed.

As shown in FIG. 2, the tracking system 20 may include an RFID reader 98 capable of reading the second unique identifier 30 from the RFID transponder 28 in the durable asset tag 84 via a first wireless data connection 100 which is an RF data connection. The RFID reader 98 may communicate the second unique identifier 30 to the AIM interface terminal 56 using a second wireless data connection 102, which may be, for example, a Bluetooth connection. The RFID reader 98 may include a first antenna 104 for communicating with the RFID transponder 28.

The first wireless data connection 100 between the RFID transponder 28 and the RFID reader 98 may require physical contact between the personal weapon 22 and the first antenna 104 of the RFID reader 98. Alternatively, the first wireless data connection 100 between the RFID transponder 28 and the RFID reader 98 may be capable of communicating over a distance separating the personal weapon 22 and the first antenna 104 of the RFID reader 98.

As shown in FIG. 8, the durable asset tag 84 may be made of metal (such as steel) and may include a body 85 having a head 106 a head as a wider portion at one end thereof, and which is exposed with the durable asset tag 84 installed in the personal weapon 22. The durable asset tag 84 may define a first cavity 108 which may be generally cylindrical for holding the RFID transponder 28 and which is exposed with the durable asset tag 84 installed in the personal weapon 22. The body 85 may be, for example, 1.157" long and 0.2708" in diameter, with a head 106 being 0.16" high and 0.4333" in diameter. The first cavity 108 may be, for example, 0.1875" in diameter and 0.1969" deep. The RFID transponder 28 may be secured in the first cavity 108 of the durable asset tag 84 by a first coating 110 of nonconductive material such as epoxy. The first cavity 108 of the durable asset tag 84 may be lined with a covering of non-conductive material, such as, for example, a nonconductive resin for shielding the RFID transponder 28 from electromagnetic interference from the metal body 85, 85', 85" of the durable asset tag.

As shown in FIG. 9, the durable asset tag 84' may instead define a second cavity 112 opposite the head 106 which may be generally cylindrical for holding the RFID transponder 28 and which may definite a first internal thread 114. The second cavity 112 may be, for example, 0.1875" in diameter and 0.1969" deep. The RFID transponder 28 may be disposed in the second cavity 112 of the durable asset tag 84' and secured therein by a second coating 116 of nonconductive material such as epoxy. A stopper 118 may enclose the second cavity 112 and cover the RFID transponder 28. The stopper 118 may include a first external thread 120 for engaging the first internal thread 114 of the second cavity 112.

Figure 11A:
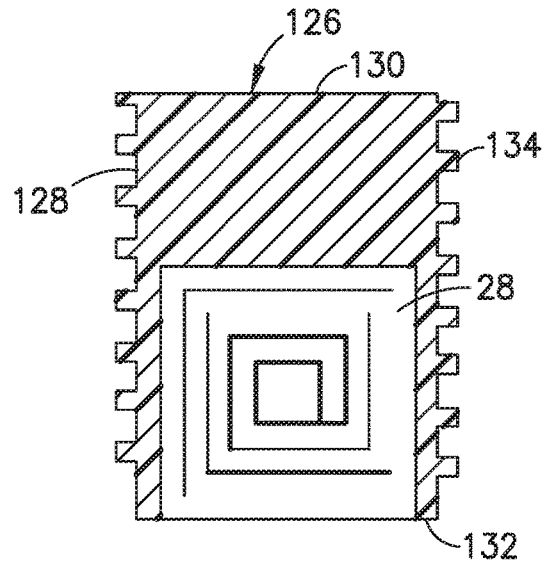
FIG. 11A is a cross-section of a plug for the durable asset tag of FIG. 10A.

The durable asset tag 84, 84', 84" may be etched as a wave guide to promote RF signal communications. As shown in FIGS. 10A-10B and 11A-11C, the durable asset tag 84" may define a third cavity 122, which may be generally cylindrical and which may have a second internal thread 124. The RFID transponder 28 may be disposed within a plug 126 fitting inside of the third cavity 122. The plug 126 may be made of electrically insulating material, such as plastic or fiberglass, for conducting RF transmissions to and from the RFID transponder 28. The plug 126 may be formed from a high tensile strength non-conducting rod such as FR4 fiberglass and may be 1.875" in diameter. As shown in FIGS. 11A-11C, the plug 126 may be generally cylindrical, including a side wall 128 extending between a first end 130 and a second end 132 and defining a second external thread 134 for threadedly engaging the second internal thread 124 with the plug 126 disposed within the third cavity 122 of the durable asset tag 84". As shown in FIG. 11B, the first end 130 of the plug 126 may define a plurality of indentations 136 for receiving a tool for screwing the plug 126 into the durable asset tag 84". As shown in FIG. 11C, the second end 132 of the plug 126 may define a slot 138 extending into the plug 126 toward the first end 130 for receiving the RFID transponder 28. The slot 138 may have a depth of about 5 mm.

Figure 10B:
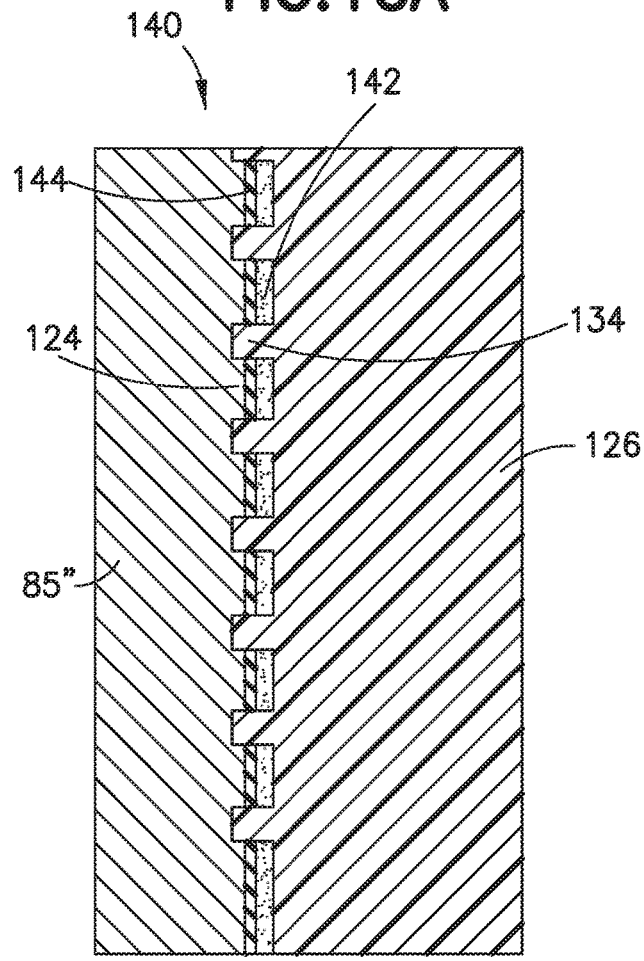
FIG. 10B is an enlarged cross-section of an the durable asset tag of FIG. 10A.
Figure 11B:
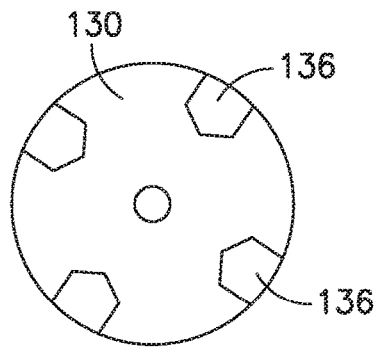
FIG. 11B is a top view of the plug of FIG. 11A.
Figure 11C:
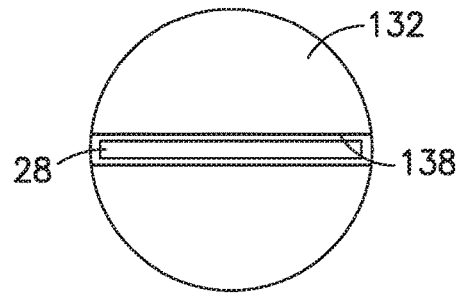
FIG. 11C is a bottom view of the plug of FIG. 11A

As best shown in FIG. 10B, the durable asset tag 84" may include a second antenna 140, which may be configured as a helical antenna, and which may include a first layer 142 of electrically conductive material, such as conductive adhesive, disposed about the side wall 128 of the plug 126 within the second external thread 134 and covered by a second layer 144 of electrical insulating material, such as resin. In this way, the first layer 142 of conductive material is sandwiched between electrically insulating materials and is isolated from direct contact with conductive structures, such as the metal body 85" of the durable asset tag 84". The first layer 142 may be in electrical communication with the RFID transponder 28, and thereby functioning as the second antenna 140 for communicating with the first antenna 104.

In practice, the durable asset tag 84, 84', 84" may be configured to replace a specific, standard component of a specific make and model of a personal weapon 22. A technician may first remove the existing component that the durable asset tag 84, 84', 84" is configured to replace. The technician may then, in a single-step operation, install durable asset tag 84, 84', 84" in the personal weapon 22. The single-step operation of installing the durable asset tag 84, 84', 84" may be, for example, screwing, pounding, pressing, or otherwise installing the durable asset tag 84, 84', 84" into an externally exposed cavity of the personal weapon 22. In this way, the technician may quickly and easily modify the personal weapon 22 to include the durable asset tag 84, 84', 84" without undertaking a complex disassembly process. Alternatively, the personal weapon may be manufactured with the durable asset tag 84, 84', 84" as an original component.

Figure 12:
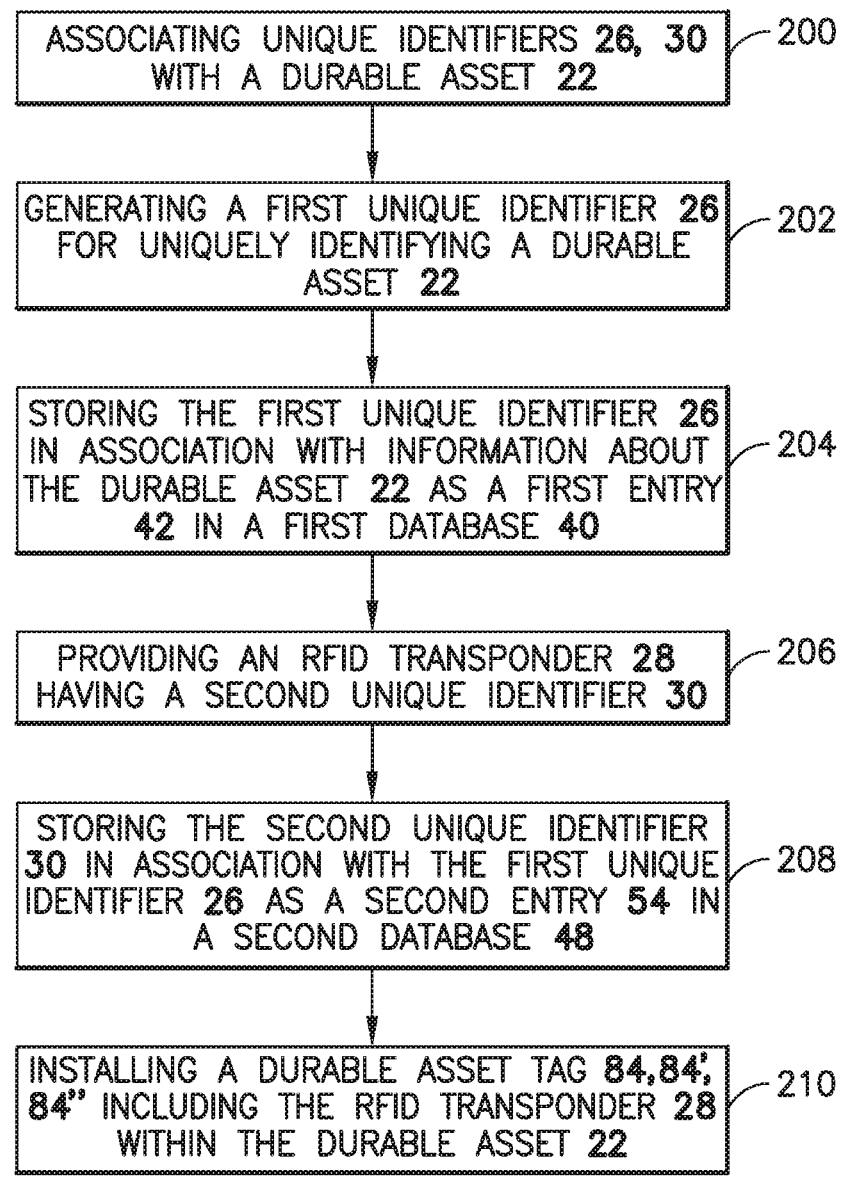
FIG. 12 is a flow chart of a method for associating unique identifiers with a durable asset according to an aspect of the subject invention.

FIG. 12 illustrates a method 200 for associating one or more unique identifiers 26, 30 with a durable asset 22, which may include a combination of one or more of the following steps: 202 generating a first unique identifier 26 for uniquely identifying a durable asset 22; 204 storing the first unique identifier 26 in association with information about the durable asset 22 as an entry 42 in a first database 40; 206 providing an RFID transponder 28 having a second unique identifier 30; 208 storing the second unique identifier 30 in association with the first unique identifier 26 as a second entry 54 in a second database 48; and 210 installing a durable asset tag 84, 84', 84" including the RFID transponder 28 within the durable asset 22.

Figure 13:
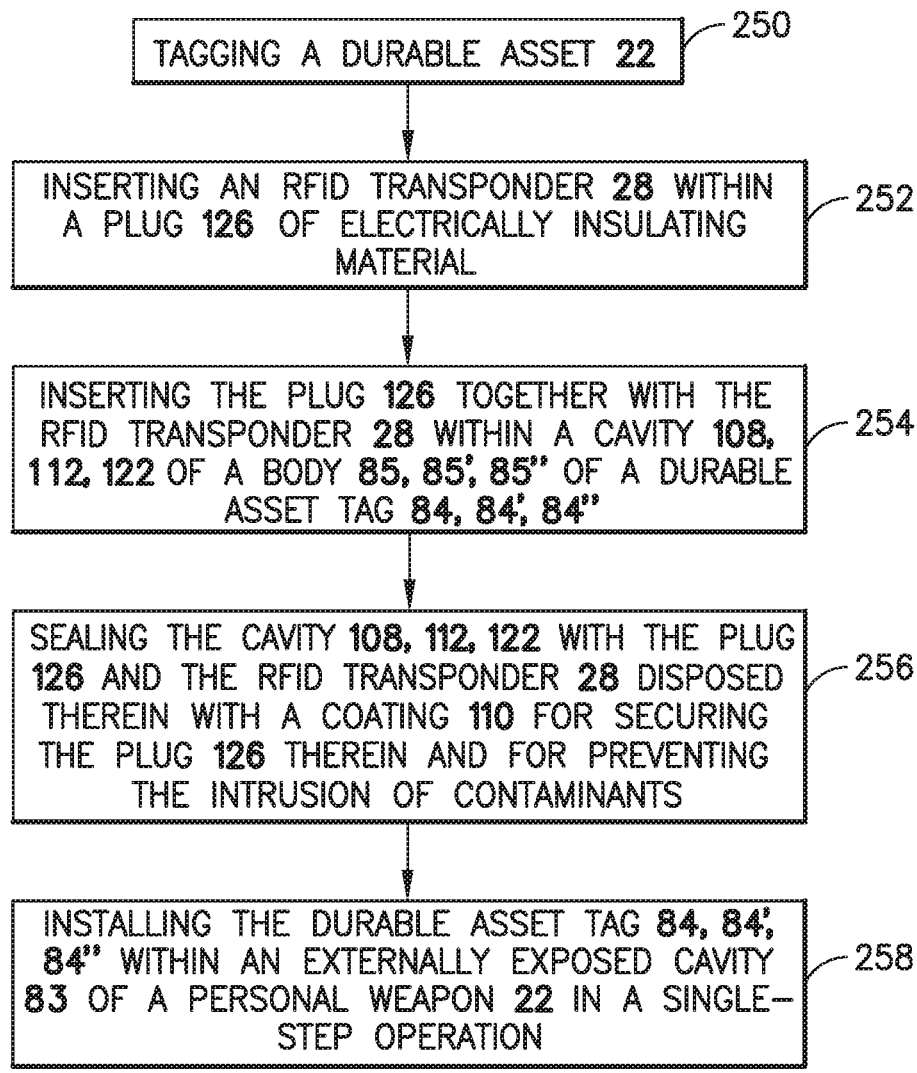
FIG. 13 is a flow chart of a method for tagging a durable asset according to an aspect of the subject invention.

FIG. 13 illustrates a method 250 for tagging a durable asset 22, which may include a combination of one or more of the following steps: 252 inserting an RFID transponder 28 within a plug 126 of electrically insulating material; 254 inserting the plug 126 together with the RFID transponder 28 within a cavity 108, 112, 122 in a body 85, 85', 85" of a durable asset tag 84, 84', 84"; 256 sealing the cavity 108, 112, 122 with the plug 126 and the RFID transponder 28 disposed therein with a coating 110 for securing the plug 126 therein and for preventing the intrusion of contaminants; and 258 installing the durable asset tag 84, 84', 84" within an externally exposed cavity of the durable asset 22 in a single-step operation. The step of 258 installing the durable asset tag 84, 84', 84" may include, for example, replacing a standard component of the durable asset 22 which is externally exposed and which has been removed. The single-step operation of installing the durable asset tag 84, 84', 84" may include, for example, screwing, pounding, pressing, or otherwise installing the durable asset tag 84, 84', 84".

Figure 14:
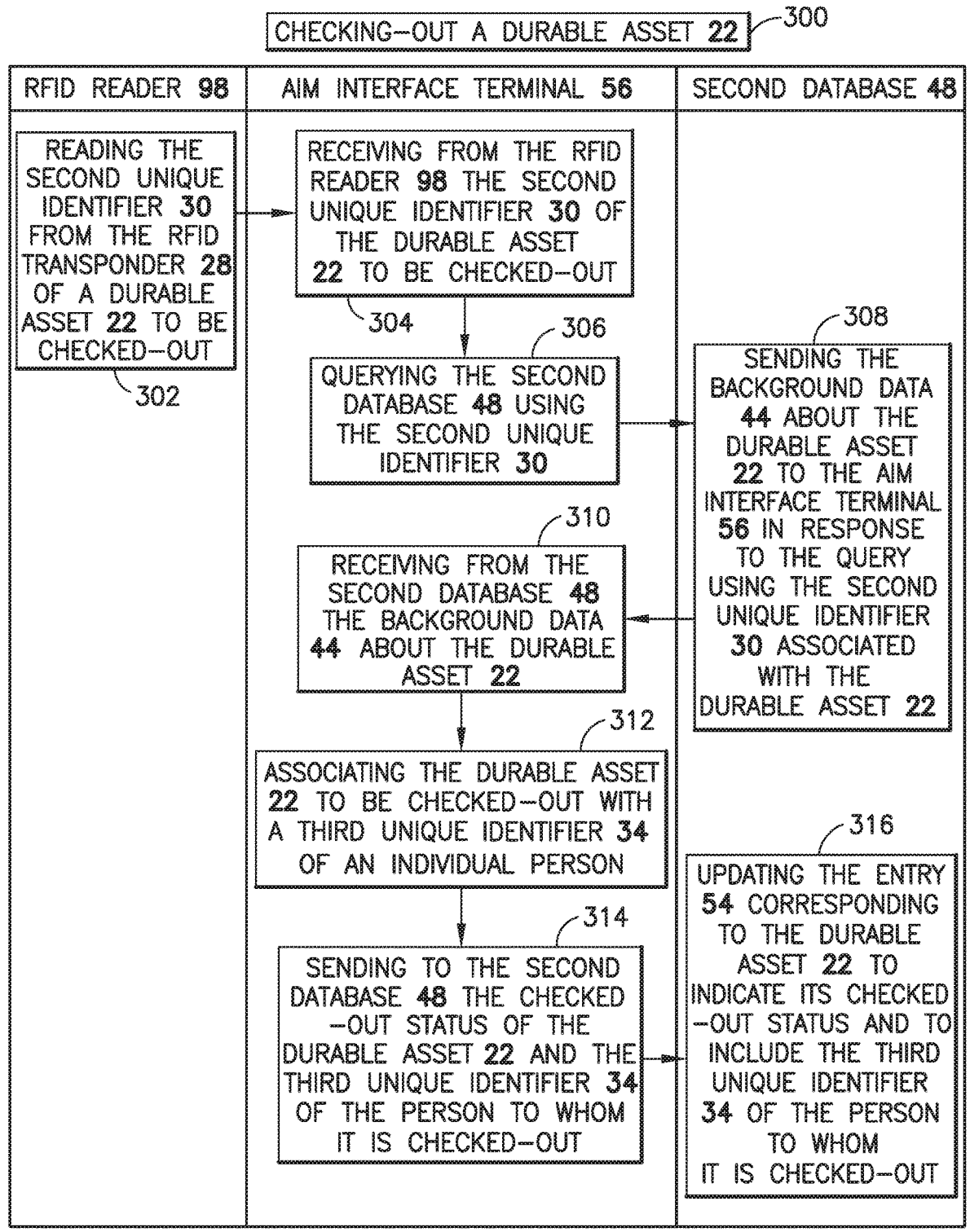
FIG. 14 is a block diagram of a method for checking out a durable asset according to an aspect of the subject invention.
Figure 15:
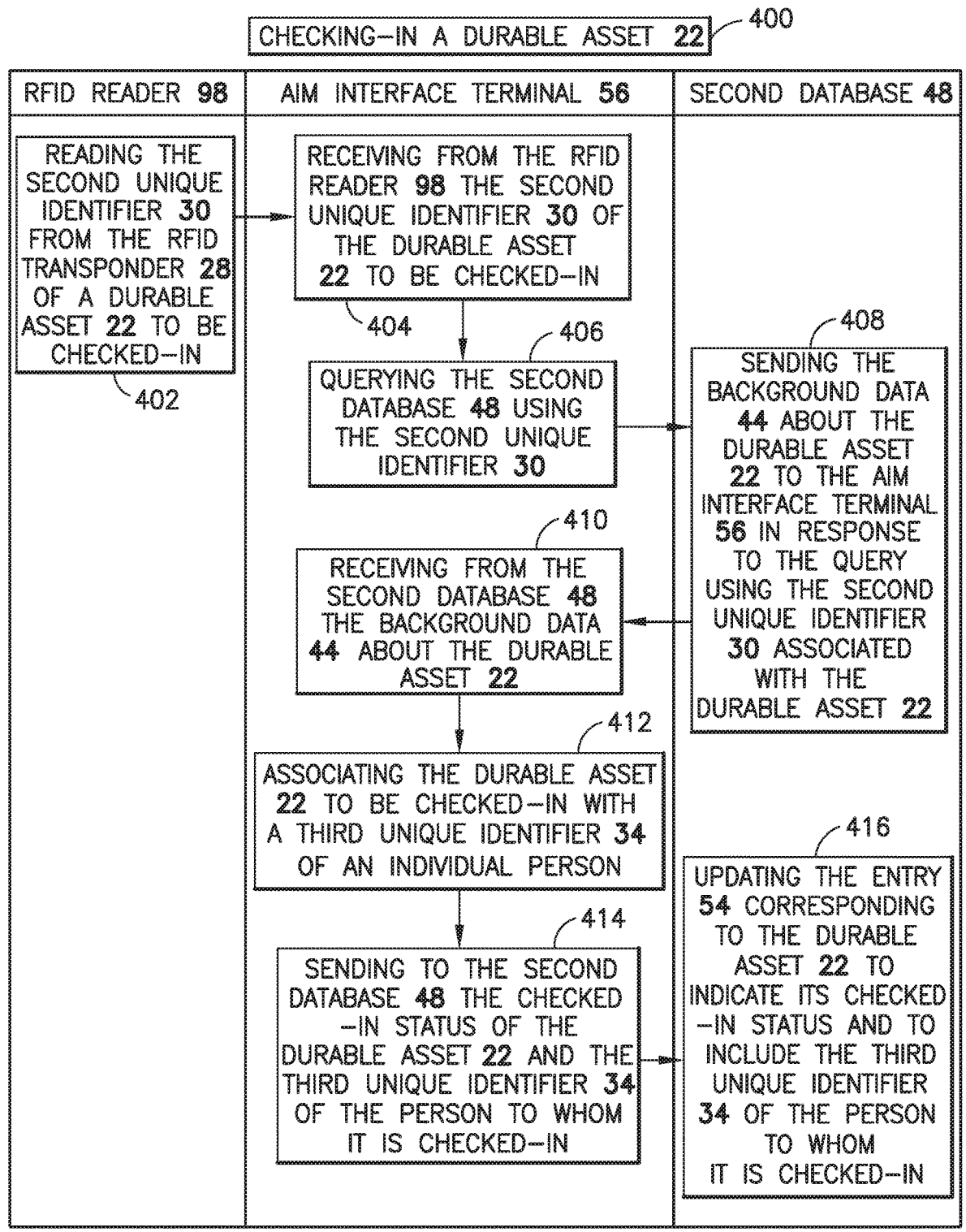
FIG. 15 is a block diagram of a method for checking in a durable asset according to an aspect of the subject invention.

FIG. 14 illustrates a method 300 for checking out a durable asset 22 to an individual person, which may include a combination of one or more of the following steps: 302 reading by the RFID reader 98 the second unique identifier 30 from the RFID transponder 28 of a durable asset 22 to be checked out; 304 receiving by the AIM interface terminal 56 from the RFID reader 98 the second unique identifier 30 of the durable asset 22 to be checked out; 306 querying by the AIM interface terminal 56 the second database 48 using the second unique identifier 30; 308 sending by the second database 48 the background data 44 about the durable asset 22 to the AIM interface terminal 56 in response to the query using the second unique identifier 30 associated with the durable asset 22; 310 receiving by the AIM interface terminal 56 from the second database 48 the background data 44 about the durable asset 22; 312 associating by the AIM interface terminal 56 the durable asset 22 to be checked out with a third unique identifier 34 of an individual person; 314 sending by the AIM interface terminal 56 to the second database 48 the checked-out status of the durable asset 22 and the third unique identifier 34 of the person to whom it is checked out; and 316 updating by the second database 48 the entry 54 corresponding to the durable asset 22 to indicate its checked-out status and to include the third unique identifier 34 of the person to whom it is checked out.

As shown in the flow chart of FIG. 14, the subject disclosure includes a method 400 for checking in a durable asset 22 from an individual person, which may include a combination of one or more of the following steps: 402 reading by the RFID Reader 98 the second unique identifier 30 from the RFID transponder 28 of a durable asset 22 to be checked in; 404 receiving by the AIM interface terminal 56 from the RFID reader 98 the second unique identifier 30 of the durable asset 22 to be checked in; 406 querying by the AIM interface terminal 56 the second database 48 using the second unique identifier 30; 408 sending by the second database 48 the background data 44 about the durable asset 22 to the AIM interface terminal 56 in response to the query using the second unique identifier 30 associated with the durable asset 22; 410 receiving by the AIM interface terminal 56 from the second database 48 the background data 44 about the durable asset 22; 412 associating by the AIM interface terminal 56 the durable asset 22 to be checked in with a third unique identifier 34 of an individual person; 414 sending by the AIM interface terminal 56 to the second database 48 the checked-in status of the durable asset 22 and the third unique identifier 34 of the person to whom it is checked in; and 416 updating by the second database 48 the entry 54 corresponding to the durable asset 22 to indicate its checked-in status and to include the third unique identifier 34 of the person to whom it is checked in.

The methods of 300 checking out the durable asset 22 and 400 checking in the durable asset 22 may be advantageously employed where the third unique identifier 34 of the individual person is machine readable by or is automatically communicated to AIM interface terminal 56. Such machine reading may be a smart card interface 68 on the AIM interface terminal 56, such as the TSS-PK series iPad reader. The AIM interface terminal 56 may also automatically and/or electronically receive the third unique identifier 34 of the individual person by other means by other methods such as, for example, by electronic, optical, digital radio, or by reading or scanning an identification card 32 associated with the individual person to whom the durable asset 22 is to be checked in or checked out.

Modifications and variations of the present invention are possible in light of the above teachings and may be practiced otherwise than as specifically described while being within the scope of the appended claims and their equivalents. Durable assets other than those described previously and which are commonly checked in and checked out for use by military, police, and other personnel may be used in connection with the present invention. Examples of such durable assets may include, for example, optics devices such as night vision goggles and weapons scopes, man-portable, and man-packable items, and larger items such as vehicles, trailers, and generators.

What is claimed is:

1. A durable asset tag provided as a structural fastener of a durable asset and comprising:
    a fastener body defining a cavity; and
    an RFID transponder having a unique identifier being machine readable by radio frequency;
        said RFID transponder disposed within said cavity of said fastener body, wherein:
        said fastener body is made of metal, said RFID transponder is disposed within a plug of electrically insulating material, and said RFID transponder and said plug are together disposed with said cavity of said fastener body;
        said durable asset tag includes an antenna being a helical antenna including a first layer of conductive adhesive being electrically conductive and disposed about a side wall within an external thread and being covered by a second layer of resin being an electrical insulator; and
        said first layer is in electrical communication with said RFID transponder and said second layer of resin encases said first layer to prevent electrical contact with said metal body, and thereby allowing said first layer to function as said antenna.

2. A tracking system for a personal weapon including:
    a personal weapon having an externally exposed cavity;
    an RFID transponder having a unique identifier being machine readable by radio frequency; and
    a durable asset tag provided as a fastener for joining two or more assembly-level components of said personal weapon and having a body defining a cavity, supporting said RFID transponder within said externally exposed cavity of said personal weapon;
    wherein said durable asset tag is installable within said externally exposed cavity in a single-step operation.

3. The tracking system for a personal weapon as set forth in claim 2, further including:
    said personal weapon including a plurality of externally exposed cavities; and
    a plurality of durable asset tags, with each durable asset tag of said plurality of durable asset tags including an RFID transponder; and
    each durable asset tag of said plurality of durable asset tags being disposed in a respective one of said plurality of externally exposed cavities of said personal weapon.

4. The tracking system for a personal weapon as set forth in claim 3, wherein each of said RFID transponders in each of said plurality of durable asset tags disposed in said personal weapon has the same unique identifier as all of the other ones of said RFID transponders in each of said plurality of durable asset tags disposed in said personal weapon.

5. The tracking system for a personal weapon as set forth in claim 2, wherein said durable asset tag is one of a buttstock slide lock pin, a takedown pin, a pistol grip screw, a pivot pin, a forward grip pin, or a front sight pin.

6. The tracking system for a personal weapon as set forth in claim 2, further including an RFID reader capable of reading said unique identifier from said RFID transponder in said durable asset tag via a first wireless data connection being an RF data connection.

7. The tracking system for a personal weapon as set forth in claim 6, further including an AIM interface terminal being a portable electronic device; and
    said RFID reader communicating said second unique identifier to said AIM interface terminal.

8. The tracking system for a personal weapon as set forth in claim 6, further including:
    said RFID reader including a first antenna; and
    said first wireless data connection between said RFID transponder and said RFID reader requiring physical contact between said personal weapon and said first antenna of said RFID reader.

9. The tracking system for a personal weapon as set forth in claim 6, further including:
    said RFID reader including a first antenna; and
    said first wireless data connection between said RFID transponder and said RFID reader being capable of communicating over a distance separating said personal weapon and said first antenna of said RFID reader.

10. The tracking system for a personal weapon as set forth in claim 2, wherein said body of said durable asset tag is made of metal.

11. A method for tracking a durable asset, comprising:
    generating a first unique identifier for uniquely identifying a durable asset;
    storing the first unique identifier in association with background data about the durable asset as a first entry in a database;
    providing an RFID transponder having a second unique identifier different from the first unique identifier;
    storing the second unique identifier in association with the first unique identifier as a second entry in a database; and
    installing a durable asset tag including the RFID transponder within the durable asset as a pin, screw or bolt forming a structural fastener of the durable asset.

12. The method for tracking a durable asset as set forth in claim 11, wherein the durable asset includes an externally exposed cavity; and
    wherein installing the durable asset tag including the RFID transponder within the durable asset further includes installing the durable asset tag within the externally exposed cavity of the durable asset in a single-step operation.

13. The method for tracking a durable asset as set forth in claim 11, wherein the durable asset is a personal weapon.

14. The method for tracking a durable asset as set forth in claim 11, wherein the background data about the durable asset includes a serial number.

15. A method for tracking a durable asset, comprising:

generating a first unique identifier for uniquely identifying a durable asset;

storing the first unique identifier in association with background data about the durable asset as a first entry in a database;

providing an RFID transponder having a second unique identifier;

storing the second unique identifier in association with the first unique identifier as a second entry in a database;

installing a durable asset tag including the RFID transponder within the durable asset as a structural component thereof; and providing an AIM interface terminal capable of securely communicating with a database and capable of electronically receiving the second unique identifier from the RFID transponder, and capable of electronically reading a third unique identifier from an identification card associated with an individual person, and further including checking out the durable asset by:

reading by an RFID reader the second unique identifier from the RFID transponder of a durable asset to be checked out;

receiving by the AIM interface terminal from the RFID reader the second unique identifier of the durable asset to be checked out;

providing an identification card associated with an individual person and having a machine readable third unique identifier and receiving by the AIM interface terminal the third unique identifier from the identification card to whom the durable asset is to be checked out;

querying the database by the AIM interface terminal using the second unique identifier and receiving from the database the background data about the durable asset;

associating by the AIM interface terminal the durable asset to be checked out with the individual person to whom the durable asset is to be checked out; and sending by the AIM interface terminal to the database a signal indicating the checked-out status of the durable asset and including the third unique identifier from the identification card to whom the durable asset is checked out.

16. A method for tracking a durable asset, comprising:

generating a first unique identifier for uniquely identifying a durable asset;

storing the first unique identifier in association with background data about the durable asset as a first entry in a database;

providing an RFID transponder having a second unique identifier;

storing the second unique identifier in association with the first unique identifier as a second entry in a database; and installing a durable asset tag including the RFID transponder within the durable asset as a structural component thereof; and providing an AIM interface terminal capable of securely communicating with a database and capable of electronically receiving the second unique identifier from the RFID transponder, and further including checking in the durable asset by:

reading by an RFID reader the second unique identifier from the RFID transponder of a durable asset to be checked in;

receiving by the AIM interface terminal from the RFID reader the second unique identifier of the durable asset to be checked in;

querying the database by the AIM interface terminal using the second unique identifier and receiving from the database the background data about the durable asset; and sending by the AIM interface terminal to the database a signal indicating the checked-in status of the durable asset.

17. The method for tracking a durable asset as set forth in claim 16, further including:

providing an identification card associated with an individual person and having a machine readable third unique identifier and receiving by the AIM interface terminal the third unique identifier from the identification card to whom the durable asset is to be checked in; and associating by the AIM interface terminal the durable asset to be checked in with the individual person from whom the durable asset is to be checked in;

wherein sending by the AIM interface terminal to the database a signal indicating the checked-in status of the durable asset further includes sending the third unique identifier from the identification card of the individual person from whom the durable asset is checked in.

18. A tracking system for a personal weapon including information on issuance to an individual person, said tracking system including:

a personal weapon being a weapon capable of being carried and used by an individual person, and having a serial number imprinted thereupon and unique to said personal weapon among all other similar weapons having the same manufacturer and model, and said personal weapon being associated with a first unique identifier being a string of characters being globally unique and unambiguous for distinguishing said personal weapon from all other like and unlike items, and said first unique identifier being a U.S. DoD standard Unique Item Identifier (UII);

an RFID transponder being a passive RFID device being externally powered and having a second unique identifier and being machine readable by radio frequency and being physically mounted within said personal weapon;

an identification card associated with the individual person and having a machine readable third unique identifier associated therewith and being a U.S. DoD Common Access Card having an integrated circuit chip including a first storage medium being computer-readable non-transitory storage and holding said third unique identifier;

a first database being an Item Unique ID (IUID) Database storing a plurality of first entries, one of said first entries being associated with said personal weapon and including said serial number and said first unique identifier, and background data including make, model, manufacturer, and acquisition date, and said first database being located on a second storage medium being a computer-readable non-transitory storage medium;

a second database being an Arsenal Inventory Management (AIM) database located on a third storage medium being a computer-readable non-transitory storage medium and storing a first plurality of second entries, with each of said second entries corresponding to a specific individual item and including said first unique identifier and said serial number and said second unique identifier, each associated therewith;

an AIM interface terminal being a portable electronic device capable of securely communicating with said second database and including a fourth storage medium being a computer-readable non-transitory storage medium storing a third database holding a second plurality of said second entries being a subset of the first plurality of said second entries in said second database;

said AIM interface terminal including a display screen for communicating information to a user, and a user input device being a touch screen, and a smart card interface for reading said third unique identifier from said integrated circuit chip in order to uniquely identify the individual person to whom said personal weapon is to be checked out to or checked in from;

an access point being a wireless router providing a first secure connection for transmitting data between said AIM interface terminal and one of said first database or said second database, and said first secure connection being a one of a Wi-Fi connection or a cellular data connection and being an HTTPS connection and secured by public key encryption;

a cloud service including a fifth storage medium being a computer-readable non-transitory storage medium and being distributed amongst one or more physical devices for temporarily storing copies of the data being sent to or read from said AIM interface terminal;

a second secure connection for transmitting data between said access point and said cloud service and being an HTTPS connection and secured by public key encryption;

a third secure connection for transmitting data between said cloud service and said first database and being an HTTPS connection and secured by public key encryption;

a fourth secure connection for transmitting data between said cloud service and said second database and being an HTTPS connection and secured by public key encryption;

a durable asset tag including said RFID transponder and being an assembly-level component of said personal weapon which remains stationary as said personal weapon fires and cycles between shots, and being cylindrical for installation within an externally exposed cavity of said personal weapon in a single-step operation;

said durable asset tag being one of a buttstock slide lock pin, a takedown pin, a pistol grip screw, a pivot pin, a forward grip pin, or a front sight pin; and an RFID reader capable of reading said Second Unique Identifier from said RFID transponder in said durable asset tag via a first wireless data connection being an RF data connection and communicating said second unique identifier to said AIM interface terminal via a second wireless data connection being a Bluetooth connection.

* * * * *